United States Patent
Odhner et al.

(10) Patent No.: US 7,313,620 B2
(45) Date of Patent: *Dec. 25, 2007

(54) CAPACITY PLANNING FOR SERVER RESOURCES

(75) Inventors: Matthew C. Odhner, Woodinville, WA (US); Giedrius Zizys, Redmond, WA (US); Kent Schliiter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

This patent is subject to a terminal disclaimer.

(21) Appl. No.: 10/897,645

(22) Filed: Jul. 23, 2004

(65) Prior Publication Data

US 2005/0005012 A1 Jan. 6, 2005

Related U.S. Application Data

(63) Continuation of application No. 09/549,816, filed on Apr. 14, 2000, now Pat. No. 6,862,623.

(51) Int. Cl.
*G06F 15/173* (2006.01)
*G06F 15/16* (2006.01)
*G06F 9/00* (2006.01)

(52) U.S. Cl. .............. 709/226; 709/224; 709/225; 709/229; 718/100; 718/104

(58) Field of Classification Search ........ 709/203, 709/223–226, 229; 718/100–105
See application file for complete search history.

(56) References Cited

U.S. PATENT DOCUMENTS

| | | | |
|---|---|---|---|
| 5,475,844 A | * | 12/1995 | Shiramizu et al. .......... 718/104 |
| 5,761,091 A | | 6/1998 | Agrawal et al. |
| 5,768,520 A | | 6/1998 | Dan et al. |
| 5,884,037 A | | 3/1999 | Aras et al. |
| 5,889,989 A | * | 3/1999 | Robertazzi et al. ......... 718/105 |
| 5,951,644 A | | 9/1999 | Creemer |
| 5,995,997 A | | 11/1999 | Horvitz |
| 6,086,618 A | | 7/2000 | Al-Hilali et al. |
| 6,148,335 A | | 11/2000 | Haggard et al. |
| 6,195,622 B1 | | 2/2001 | Altschuler et al. |
| 6,230,204 B1 | | 5/2001 | Fleming, III |
| 6,263,361 B1 | | 7/2001 | Hoyer et al. |
| 6,279,039 B1 | | 8/2001 | Bhat et al. |
| 6,327,677 B1 | | 12/2001 | Garg et al. |
| 6,351,775 B1 | | 2/2002 | Yu |
| 6,374,300 B2 | | 4/2002 | Masters |
| 6,408,335 B1 | | 6/2002 | Schwaller et al. |
| 6,430,618 B1 | | 8/2002 | Karger et al. |

(Continued)

OTHER PUBLICATIONS

Durham, D. et al. "The COPS (Common Open Policy Service) Protocol," RFC 2748, Jan. 2000, pp. 1-38.*

(Continued)

*Primary Examiner*—Melvin H. Pollack (57) ABSTRACT

Methods and systems for capacity planning of server resources are described wherein fixed resources of a server cluster are used in comparison to similar server cluster benchmarks to determine the maximum load—requests per second—that can be handled by the server cluster. The maximum load is used to determine utilization of server resources and to provide estimates of server resource utilization for hypothetical loads. A recommendation as to changes to server resources to handle the hypothetical loads is displayed to the user.

40 Claims, 6 Drawing Sheets

U.S. PATENT DOCUMENTS

| | | | |
|---|---|---|---|
| 6,460,082 B1 | 10/2002 | Lumelsky et al. | |
| 6,463,454 B1 | 10/2002 | Lumelsky et al. | |
| 6,487,170 B1 | 11/2002 | Chen et al. | |
| 6,516,348 B1 | 2/2003 | MacFarlane et al. | |
| 6,542,854 B2 | 4/2003 | Yang et al. | |
| 6,574,587 B2* | 6/2003 | Waclawski | 702/186 |
| 6,578,068 B1 | 6/2003 | Bowman-Amuahm | |
| 6,606,658 B1 | 8/2003 | Uematsu | |
| 6,862,623 B1* | 3/2005 | Odhner et al. | 709/226 |
| 2001/0003830 A1* | 6/2001 | Nielsen | 709/226 |
| 2002/0046268 A1* | 4/2002 | Leong et al. | 709/223 |
| 2002/0059365 A1* | 5/2002 | King et al. | 709/203 |

OTHER PUBLICATIONS

Apostolopoulos, G. et al. "QoS Routing Mechanisms and OSPF Extensions," RFC 2676, Aug. 1999, pp. 1-50.*

Crawley, E. et al. "A Framework for QoS-based Routing in the Internet," RFC 2386, Aug. 1998, pp. 1-37.*

Shenker, S. et al. "Specification of Guaranteed Quality of Service," RFC 2212, Sep. 1997, pp. 1-20.*

Brisco, T. "DNS Support for Load Balancing," RFC 1794, Apr. 1995, pp. 1-7.*

Bestavros, Azer. "Speculative Data Dissemination and Service to Reduce Server Load, Network Traffic and Service Time in Distributed Information Systems," Proceedings of the 12th Intl. Conference on Data Engineering, Mar. 1, 1996, pp. 180-187.*

Bestavros, Azer, et al. "Application-Level Document Caching in the Internet," 2nd Intl. Workshop on Services in Distributed and Networked Environments, Jun. 6, 1995, pp. 166-173.*

Youssef, S.A. "Bandwidth Allocation of Variable Bit Rate Video in ATM Networks Using Radial Basis Function Neural Networks" IEEE International Conference on Communications, Jun. 6-10, 1999. vol. 1, pp. 152-156.

Kim, JunSeong and Lilja, David J. "A Network Status Predictor to Support Dynamic Scheduling in Network-Based Computing Systems." 13th Intl. and 10th Symposium on Parallel and Distributed Processing, 1999, pp. 372-378.

Alqadi, Raed and Ramanathan, Parameswaran. "Analysis of Resource Lower Bounds in Real-Time Applications." IEEE 1995, pp. 188-195.

* cited by examiner

| CAPACITY PLANNING WORKSHEET |
|---|
| MANUAL PLANS: MANUAL PLAN 1 |

| CAPACITY CALCULATION | | MACHINE INFORMATION | |
|---|---|---|---|
| DESIRED CLUSTER REQ/SEC: | | PROCESSOR TYPE: | ▽ |
| NO. SERVERS IN CLUSTER: | | PROCESSORS/MACHINE: | ▽ |
| AVAILABLE BANDWIDTH: | | SPEED: ▽ MEM/MACH (MB): | |

| DOCUMENT TYPE INFO | | | CLIENT CONNECTIONS | | |
|---|---|---|---|---|---|
| HTML: 0 - 10 KB | 100 | % | 14,000 BPS | 100 | % |
| HTML: 11 - 1000 KB | 0 | % | 28,000 BPS | 0 | % |
| HTML: > 1000 KB | 0 | % | 56,000 BPS | 0 | % |
| ASP: 0 OBJECTS | 0 | % | ADSL | 0 | % |
| ASP: 1 OBJECT | 0 | % | T1: | 0 | % |
| ASP: >1 OBJECTS | 0 | % | T3 AND ABOVE: | 0 | % |

| WORKSHEET RESULTS |
|---|

| PERFORMANCE GRAPHS | | RECOMMENDATIONS |
|---|---|---|
| GEN. | 77% | PROCESSOR UTILIZATION IS 90% ON SERVER CLUSTER. ADDING PROCESSOR IS RECOMMENDED. |
| PROC. | 40% | |
| B/W | 98% | |
| MEM. | 64% | <<PREVIOUS  ALL  NEXT>> |

REMOVE PLAN | UPDATE NOW

300

MANUAL METHOD
USER INTERFACE

| CAPACITY PLANNING WORKSHEET |
|---|
| HISTORICAL PLANS: HISTORICAL PLAN 1 |

CAPACITY PLANNING INFORMATION

| HISTORIC TIME PERIOD | CAPACITY INCREASE |
|---|---|
| ○ PREDEFINED: [ ▽ ] | CURRENT REQUESTS / SEC: [ ] |
| ● CUSTOM:   START: [ 01/01/00 ▽ ] | INCREASE REQ / SEC BY (%): [ ] |
|   AT: [ 09:00:00 ▽ ] | NEW REQUESTS / SEC: [ ] |
|   END: [ 12/31/00 ▽ ] | NUMBER OF SERVERS: [ ] |
|   AT: [ 10:00:00 ▽ ] | AVAILABLE BANDWIDTH: [ ▽ ] |

WORKSHEET RESULTS

| PERFORMANCE GRAPHS | | RECOMMENDATIONS |
|---|---|---|
| GEN. | 77% | PROCESSOR UTILIZATION IS 90% ON SERVER CLUSTER. ADDING PROCESSOR IS RECOMMENDED. |
| PROC. | 40% | |
| B/W | 98% | |
| MEM. | 64% | [<<PREVIOUS] [ALL] [NEXT >>] |

[REMOVE PLAN] [UPDATE NOW]

HISTORICAL METHOD RESULTS

Fig. 7

CAPACITY PLANNING FOR SERVER RESOURCES

RELATED APPLICATIONS

This is a continuation of U.S. patent application Ser. No. 09/549,816, filed on Apr. 14, 2000, entitled "Capacity Planning For Server Resources", listing Matt Odhner, Giedrius Zizys and Kent Schliiter as inventors, and which is assigned to the assignee of this application, now U.S. Pat. No. 6,862,623, which is hereby incorporated by reference. This application is related to U.S. Patent application Ser. No. 10/897,645, filed on Jul. 23, 2004, which is a divisional of application Ser. No. 09/549,816, and which is also assigned to the assignee of this application.

TECHNICAL FIELD

This invention relates to server systems, and more particularly to systems and methods for server resource capacity planning in server systems.

BACKGROUND

Capacity planning is forward-looking resource management that allows a computer system administrator to plan for expected changes of system resource utilization and alter a system to adequately handle such changes. Server performance and capacity planning is a top concern of computer administrators and business managers. If a lack of proactive and continuous capacity planning procedure leads to unexpected unavailability and performance problems, the downtime that results could be financially devastating to a company that depends heavily on server performance, such as an Internet-based merchant.

The importance of superior capacity planning is heightened by the continuous growth in server-dependent companies and potential customers for such companies. Even a solid company that has millions of customers can quickly decline in popularity if it does not increase its resources to handle a constant increase in customers. Excessive downtime of such a company can cause customers to take their business elsewhere.

Capacity planning requires both scientific and intuitive knowledge of a server system. It requires in-depth knowledge of the resource being provided and an adequate understanding of future server traffic. The difficulty of the problem has increased by the development of technology in which multiple servers, or a server cluster, is employed to handle a network or an Internet website.

Current capacity planning methods do not adequately estimate a number of servers having certain resources that a system will need to handle expected loads (number of requests per second). Therefore, a capacity planning method and system is needed in which a user can provide an expected load that the system needs to handle and receive information on how to increase servers and/or resources to adequately handle that load.

SUMMARY

Methods and systems for providing capacity planning of server resources are described herein. The methods and systems contemplate using measured data, estimations and extrapolation to provide capacity planning results that are more accurate than current schemes. Server resources for which utilization is calculated are processor utilization, communication bandwidth utilization, memory utilization, and general server utilization.

Utilization is expressed in terms of actual use of the resource in relation to the total amount of resource available for use. For example, processor utilization is expressed as a percentage of total processing power available. Communication bandwidth utilization is expressed as a percentage of total communication bandwidth available. Memory utilization is expressed as a percentage of total memory available. General server utilization is expressed as a ratio between a current service rate (number of requests per second served) and maximum possible service rate (maximum number of requests the server is capable of serving). This is less specific than showing the processor, bandwidth, and memory utilization, but it is useful for viewing resource constraints that do not fall under the other three categories.

In a first implementation described herein—referred to as a 'manual' method—a user provides several server parameter values that indicate operating parameters for one or more servers in a server cluster. The parameters include, but are not limited to, a specified load to be handled by the server cluster, the number of servers in the cluster, the available communication bandwidth, the processor type and speed for each machine, and the number of processors and amount of memory per machine.

In addition, the user provides document type information that includes the types of documents the server cluster will transmit in response to requests from clients. In the manual method, the documents are classified according to type and size of document, and the user provides the capacity planner with the percentage of each type of document as it relates to the entire amount of documents.

The user also provides information regarding the percentages of different client connections, e.g., 14K, 56K, ADSL, T1, etc. The differences in client connection types affect the resources of the server. For instance, if a client connects to the server cluster at a lower connection speed, then that connection will be held open for a longer period of time to accommodate data transmission and more server resources will be consumed than if the client had connected at a higher connection speed.

A theoretical maximum load value is obtained from a pre-defined load table that contains empirically-derived maximum load values handled by servers having a known amount of memory and a processor having a known speed. If the server does not have a processor speed and memory that exactly matches a load table entry, then the closest match is found and the load value for that match is used as the maximum load that can be handled by the system. This maximum load value is used in calculations to obtain the server resource utilization estimates.

Once the server resource utilizations have been derived, a recommendation is made to the user as to what changes, if any, need to be made to the server cluster to accommodate the specified load. For instance, if a specified load input by the user produces a processor utilization estimate of, say 90%, the capacity planner would recommend that another processor be added to the server cluster to safely handle the specified load.

In a second implementation described herein—referred to as a 'historical' method—a filter, such as an ISAPI (Internet Server Application Programmer Interface) filter, collects actual server communication parameter values at certain time intervals from the server cluster. Also, a monitor on each server in the server cluster collects other types of server parameter values at certain time intervals. The collected server parameter values are then used to extrapolate a maximum load that the server cluster can handle. The extrapolated maximum load is used to calculate utilization of server resources, similar to the method described above. The user inputs a load desired to be handled by the server cluster and receives a recommendation for server cluster changes that will enable the server cluster to adequately handle the load. The historical method provides a more accurate result than the manual method because it uses actual server cluster data.

BRIEF DESCRIPTION OF THE DRAWINGS

A more complete understanding of the various methods and arrangements of the present invention may be had by reference to the following detailed description when taken in conjunction with the accompanying drawings, wherein.

DETAILED DESCRIPTION

Figure 1:
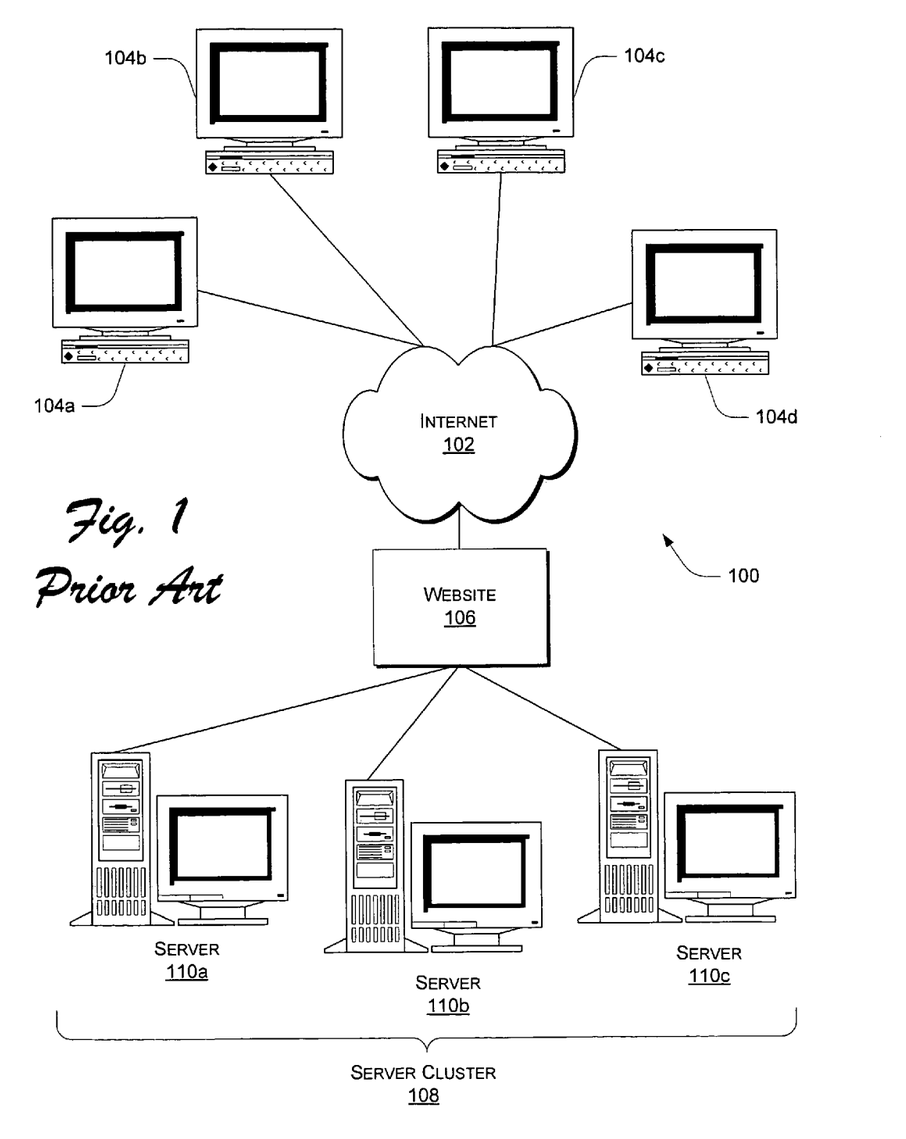
FIG. 1 is an illustration of a server-client system having a server cluster that supports a website on the Internet.

FIG. 1 shows a typical Internet-based server-client system 100. The system 100 includes several clients 104a, 104b, 104c, 104d connected to the Internet 102. A website 106 runs on a server cluster 108 comprised of three servers 110a, 11b, 110c. Although the server-client system 100 is shown operating within an Internet website context, it is noted that the server-client system may operate in any server-client network context, such as a local area network (LAN) or a wide area network (WAN).

Figure 2:
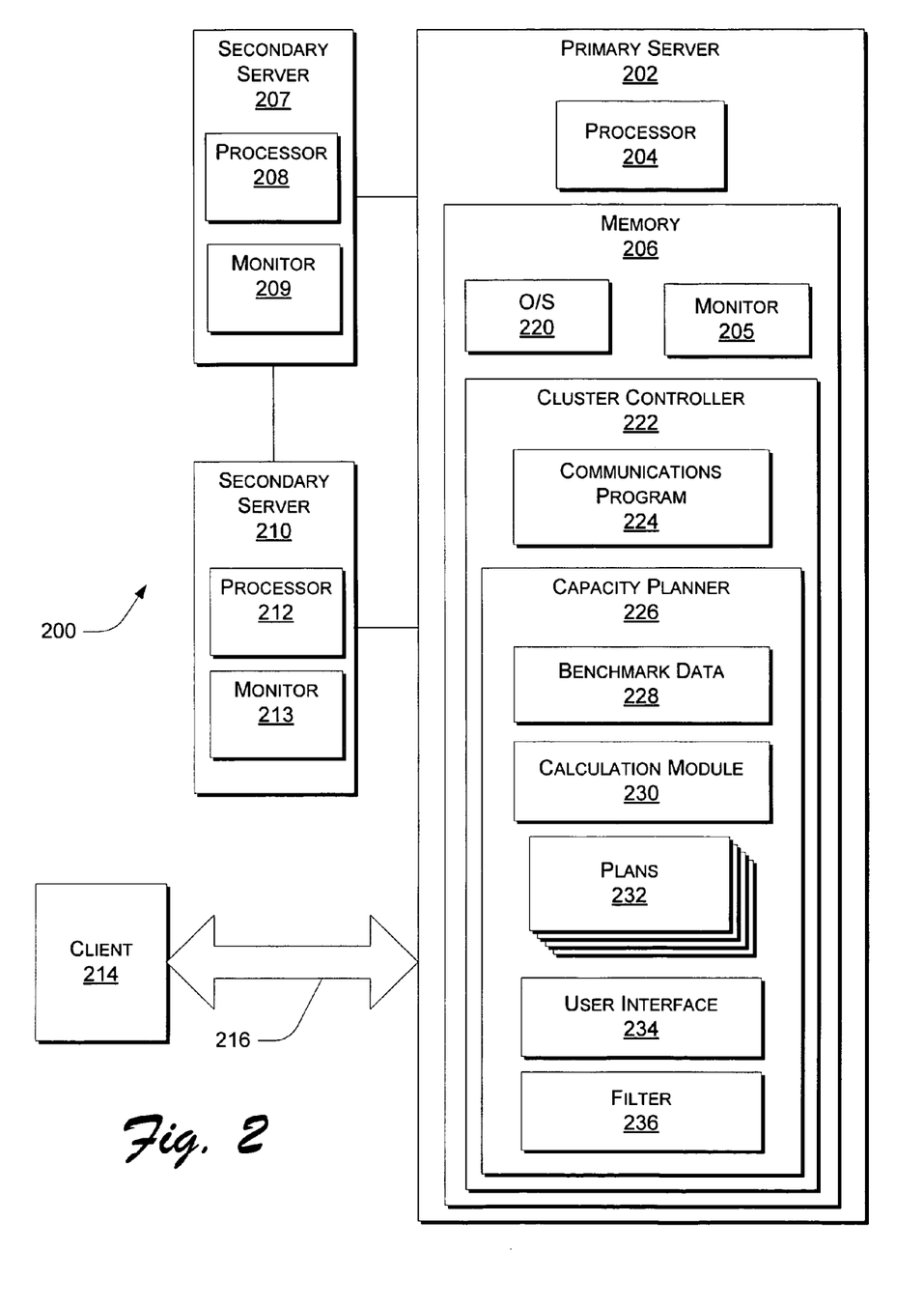
FIG. 2 is a high-level block diagram of a server cluster having capacity planning capability.

FIG. 2 depicts a server cluster 200 in accordance with the described implementations. The server cluster 200 comprises a primary server 202 having a processor 204 and a monitor 205 resident in memory 206, a first secondary server 207 having a processor 208 and a monitor 209, and a second secondary server 210 having a processor 212 and a monitor 213. The monitors are software applications that collect server parameter values while the server cluster 200 is in operation. It is noted, however, that the monitors can be hardware units or firmware modules that perform the same function as described herein. The server cluster 200 communicates with a client 214 via a communications connection 216. Although only one client 214 is shown in communication with the server cluster 200, it is understood that many clients may be similarly connected to the server cluster 200.

The primary server 202 also includes an operating system 220 resident in the memory 206. The operating system 220 provides resource management for primary server 202 resources. The memory 206 of the primary server 202 includes a cluster controller 222, which controls communications between the primary server 202 and the secondary servers 206, 210 and between the server cluster 200 and the client 214. To accomplish this, the cluster controller 222 is provided with a communications program 224.

A capacity planner 226 is included in the cluster controller 222. The function of the capacity planner 226 and its components will be described in greater detail below. Generally, the capacity planner 226 comprises benchmark data 228 in which empirically-derived test data from similar systems is stored, a calculation module 230 which stores the equations necessary to derive server resource utilization estimates, and plans 232 which store server parameter values and recommendations.

In addition, the capacity planner 226 includes a user interface 234 and a filter 236. The user interface 234 provides areas wherein a user of the server cluster 200 in general and, more specifically, the capacity planner 222 can enter server parameter values and/or a specified load for which the user wants to see server resource utilization and recommendations. The filter 236 is used to collect actual server parameter values from the server cluster 200 while the server cluster 200 is operating.

The implementations and functions of the components of the server cluster 200 outlined above will become more clear as the discussion progresses with continuing reference to the components of FIG. 2.

The server resources that are discussed herein are: (1) processor utilization (also referred to herein as CPU utilization), expressed as a percentage of total processing power available; (2) memory utilization, expressed as a percentage of total memory available; (3) communication bandwidth utilization, expressed as a percentage of total communication bandwidth available; and (4) general server utilization, expressed as a ratio between current service rate (number of requests served per second) and maximum possible service rate (maximum number of requests the server cluster 200 is capable of serving per second). The general server utilization does not show specific utilization estimates such as the processor, bandwidth, and memory utilizations, but it shows an overall view of resource constraints that do not fall under the other categories.

Manual Method

Figure 3:
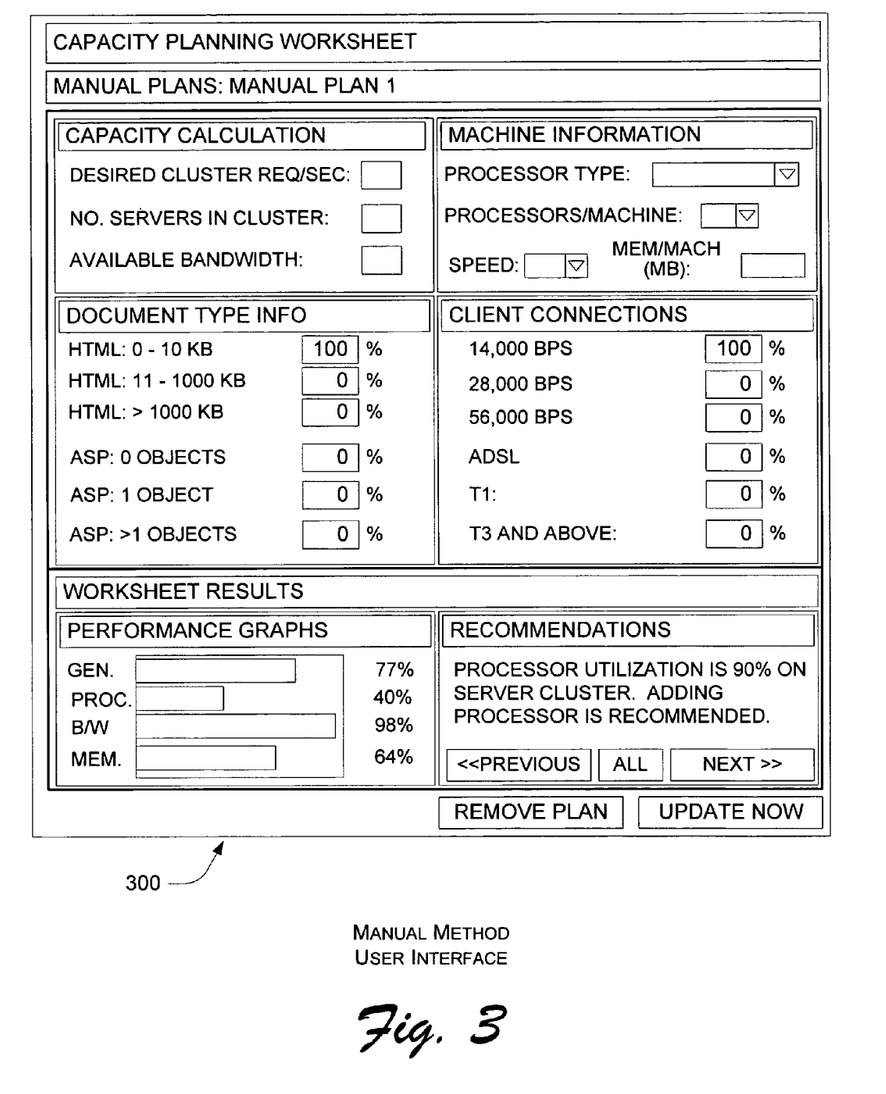
FIG. 3 is a screen shot of a capacity planning worksheet utilized in a manual method of capacity planning.

FIG. 3 shows a screen shot of a user interface 300 for the manual method that is in the form of a capacity planning worksheet, wherein the user enters the specified load for which the user desires to observe the effects on the system of handling such a load. The user is required to manually enter several server parameter values. These server parameter values include: number of servers in the server cluster, available communications bandwidth, processor type, number of processors per server, processor speed, and amount of memory per server.

In addition, the user must enter information regarding document types and client connections. These parameters have an affect on server resources due to their size and speed. For example, a larger document will require more communication bandwidth for transmission than will a smaller document, and it will require more computing power to process. Also, a client connected at a slower speed, e.g., 14K BPS, will consume server resources for a longer period of time than a client connected at a faster speed, e.g., 56K BPS, because the client connection will be held open longer to accommodate the slower connection transmitting the document. Therefore, these are important considerations that must be taken into account.

The user provides document type information in terms of the percentage of total documents that each document type comprises. In the manual method described herein, documents are divided into six document types. These document types are categorized in terms of the kind of document, hypertext markup language (HTML) documents or active server pages (ASP), and the size range of the documents. The six document types utilized in the manual method are: HTML documents from zero to ten kilobytes; HTML documents from eleven to one thousand kilobytes; HTML documents greater than one thousand kilobytes; ASP documents having zero COM (component object model) objects; ASP documents having one COM object; and ASP documents having more than one COM object. The user enters a percentage for each document type that the user expects the server cluster 200 to service. The user must estimate these percentages, but if there is sufficient history available to the user, the estimates can be fairly accurate.

Similarly, the user provides client connection information in terms of the percentage of total connections that each connection type comprises. In the manual method discussed herein, client connections are divided into six types: (1) 14K BPS; (2) 28K BPS; (3) 56K BPS; (4) ADSL; (5) T1; and (6) T3 and above. The user enters a percentage for each client connection type that the user expects the server cluster 200 to service. As with the document type estimates, the user's knowledge of the history of types of client connections to the system will help to provide more accurate server resource utilization estimates.

The user interface 300 also provides the server resource utilization estimates and recommendations to the user after the capacity planner 222 has completed its calculations. For convenience purposes, these results will be discussed in detail below.

Figure 4:
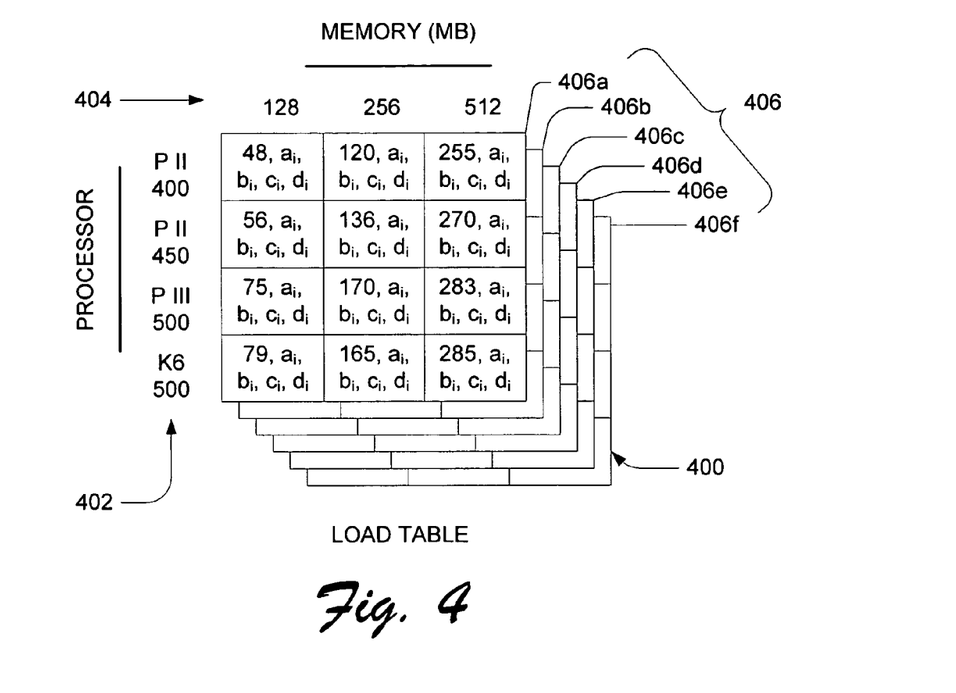
FIG. 4 is a three-dimensional table of load figures based on processor speed and memory.

FIG. 4 shows, in detail, the benchmark data 228 stored in the capacity planner 222. A load table 400 is a pre-defined, three-dimensional matrix of empirically-derived results from tests performed on a variety of hardware configurations. It is noted that the load table 400 is used only in the first embodiment—the "manual approach"—described herein.

The load table 400 has three dimensions: processor type/speed 402, memory 404, and document type 406. The processors depicted are PII-400, PII-450, PIII-500, K6-500, although any type and speed of processor could be used in a benchmark configuration. Likewise, memory amounts depicted are 128M, 256M and 512M, although any amount of memory could be used in a benchmark configuration. As previously discussed, six documents types are utilized, although more or less could be implemented. Therefore, the load table 400 is a 2×2×6 matrix in this particular depiction, and the document types 406 designated in the load table 400 are 406*a*, 406*b*, 406*c*, 406*d*, 406*e*, and 406*f*.

Each entry in the load table 400 comprises five values: a maximum load handled by the hardware configuration, a first processor regression constant ($a_i$), a second processor regression constant ($b_i$), a first bandwidth regression constant ($c_i$), and a second bandwidth regression constant ($d_i$). The subscript i in these examples represents the document type associated with the constant. The load table 400 shown in FIG. 4 shows an arbitrary representative maximum load value (X number of requests per second) for discussion purposes only. The other values are represented simply by their corresponding constant, a, b, c and d.

In making the calculations in the implementations described herein, it is assumed that the server cluster 200 is a single service point with infinite queue size. Queuing theory is then applied to determine most server resource values. Analysis shows that there exist certain functional dependencies between an incoming request rate (load) and other server resource values. In each case, two values are sought to be determined: (1) maximum load (maximum number of requests per second the server is capable of serving); and (2) functional dependency between incoming request rate and different resources.

Processor utilization and communication bandwidth utilization are calculated using functional dependency approximation between resource utilization and load. For functional dependency approximation, linear regression is utilized. For processor utilization, the functional dependency is transformed into linear form by applying standard logarithmic transformation.

The linear equation to be solved has the form of:

$$y=a+b\cdot x$$

where y equals utilization and x equals load.

The results of the empirical testing referred to above result in a number of pairs (x, y). Linear regression is used to solve this equation using the (x, y) pairs:

$$g(x) = \overline{y} + b_{yx} \cdot (x - \overline{x})$$

where:

$$b_{xy} = \frac{\overline{(x-\overline{x})\cdot(y-\overline{y})}}{\overline{(x-\overline{x})^2}}$$

Therefore, processor regression constants a and b are:

$$a=\overline{y}-b_{yx}\overline{x} \text{ and } b=b_{yx}.$$

The calculations to derive the bandwidth regression constants c and d are similar to those described for processor regression constants a and b.

In that case, the linear equation to be solved has the form of:

$$y=c+d\cdot x$$

where y equals utilization and x equals load.

The results of the empirical testing referred to above result in a number of pairs (x, y). Linear regression is applied to solve:

$$g(x) = \overline{y} + d_{yx} \cdot (x - \overline{x})$$

where:

$$d_{xy} = \frac{\overline{(x-\overline{x})\cdot(y-\overline{y})}}{\overline{(x-\overline{x})^2}}$$

Therefore, bandwidth regression constants c and d are:

$$c=\overline{y}-d_{yx}\overline{x} \text{ and } d=d_{yx}.$$

It is extremely difficult to find a functional dependency of memory usage, so the manual method uses a heuristic formula for calculating the required memory. Also, the calculated amount of memory depends on the number of incoming requests. The memory utilization formula will be discussed in greater detail below.

In deriving server resource utilization estimates, the server parameter values for memory, processor type and processor speed that are input by the user are compared to the load table 400. If there is an exact match, then the values (load, $a_i$, $b_i$, $c_i$ and $d_i$) for the entry corresponding to the processor and the memory are utilized in the utilization calculations.

Figure 5:
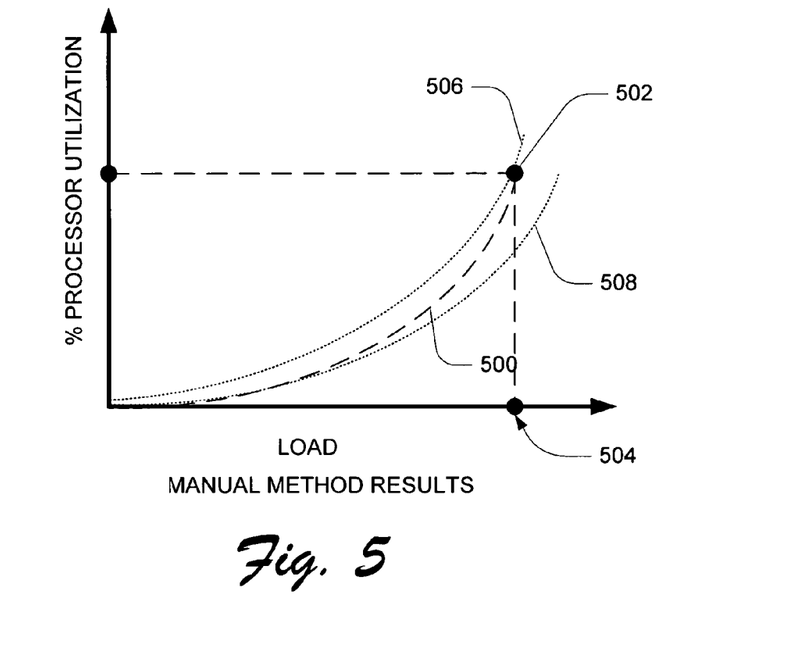
FIG. 5 is a graph of load vs. processor utilization for a manual method of capacity planning.

If, however, there is no exact match, the calculation module 230 of the capacity planner 226 determines the closest match to the input server parameter values and substitutes the values in the entry for the closest match in the utilization calculations. FIG. 5 demonstrates how this matching process closely approximates the exact utilization values, but could cause some degree of error in the utilization calculations.

FIG. 5 depicts a load vs. utilization graph of the function for processor utilization, as explained previously. An exact match results in function curve 500, which shows a point 502 that indicates the processor utilization for the specified load 504. If, however, there is no match, the closest match found in the load table 400 is used. Function curve 506 shows the result when the closest match found is reasonably close to the actual server hardware configuration. In this instance, the error is reasonably insignificant. Function curve 508 shows the result when the closest match found is not sufficiently representative of the server hardware configuration. The error is greater than the error in function curve 506, but it still provides a utilization figure that is a reasonably adequate to provide a user with useful planning information.

When the server parameter values have been input, the server resource utilization estimates are calculated. The general server utilization is derived by solving:

$$U = \sum_i \frac{q_i \cdot L}{X_i}$$

wherein:
i is the document type;
$q_i$ is the document value for document type i, i.e., the percentage that document type i makes up of the total documents (expressed in decimal form);
L is the specified load input by the user; and
$X_i$ is the load value obtained from the load table for document type i.

The processor utilization estimate is derived by solving:

$$U_{CPU} = \sum_i \frac{a_i}{e^{b_i \cdot q_i \cdot L}}$$

wherein:
$U_{CPU}$ is processor utilization;
i is the document type;
$a_i$ is the regression constant a for document type i (from the load table 400);
$b_i$ is the regression constant b for document type i (from the load table 400);
$q_i$ is the document value for document type i; and
L is the specified load.

The communications bandwidth utilization estimate is derived by solving:

$$U_B = \sum_i \frac{F_{TCP} \cdot (c_i + d_i \cdot q_i \cdot L)}{B}$$

wherein:
$U_B$ is communication bandwidth utilization;

$F_{TCP}$ is a transmission overhead factor for each document type that, when applied to a certain size page of the document type, results in the actual bandwidth necessary to transmit the page (for example, a 1 KB HTML document may actually require 1.3KB to transmit; in such a case, $F_{TCP}$ is 1.3);
i is the document type;
$c_i$ is the regression constant c for document type i;
$d_i$ is the regression constant d for document type i;
$q_i$ is the document value for document type i;
L is the specified load; and
B is the total communication bandwidth available.

The memory utilization estimate is derived by first solving the following equation to determine the number of concurrent connections:

$$N = \sum_i \left(\frac{q_i \cdot L}{(X_i - q_i \cdot L)}\right) + S1 \cdot q_i \cdot L$$

wherein:
i is the document type;
$q_i$ is the document value for document type i;
L is the specified load;
$X_i$ is the load value obtained from the load table for document type i; and
S1 is a connection memory factor that is the adjusted average of the incoming connections at different speeds. For example, suppose that the user has input the following percentages for connection types in the user interface 300:
56K: 50%
ADSL: 20%
T1: 20%
T3: 10%.

Then S1 is the adjusted average of these connection speeds:

| | | |
|---|---|---|
| 56K: | 0.5 * 5.6 | = 2.8 KBytes/sec |
| ADSL: | 0.2 * 30 | = 6 KBytes/sec |
| T1: | 0.2 * 150 | = 30 KBytes/sec |
| T3 | 0.1 * 4500 | = 450 KBytes/sec |

S1=488.8 KBytes/sec.
Memory utilization is then derived by solving:

$$U_M = \frac{N \cdot (M_{TCP} + M_{IISStruct}) + M_{OS} + M_{IIS}}{M}$$

wherein:
$U_M$ is memory utilization;
$M_{TCP}$ is an amount of memory for TCP buffers (32 KB per connection);
$M_{IIS}$ is the amount of memory required by a server communication program (50 MB for IIS (see note below));
$M_{IISStruct}$ is the amount of memory necessary to support communications program data structures associated with each connection (50 KB per connection for IIS (see note below));

$M_{OS}$ is the amount of memory required by a server operating system (64 MB for Windows® NT by Microsoft® Corp.) and M is the amount of total memory available.

It is noted that the designation IIS and IISStruct for the communications program and the data structures related thereto is derived from the communications program "Internet Information Server" from Microsoft® Corp. The figures may be different is a different communication program is used.

Referring now back to FIG. 3, the server resource utilizations are displayed to the user via the user interface 300. Although the server resource utilizations are shown displayed as a graph, the utilizations may be displayed to the user in any number of ways.

The calculation module 230 uses the server parameter values and the server resource utilizations to recommend a plan to the user. The plan will advise the user as to what configuration changes need to be made to the server cluster 200 to ensure that the specified load will be adequately handled, thus virtually eliminating down time that could be costly to the user. The calculation module 230 may use various rules to determine when different resources should be added. For instance, if the processor utilization is greater than 90%, the calculation module may display a message to the user that recommends an additional processor.

Historical Method

The historical method is a second implementation of the present invention that is useful for: (1) projecting future capacity based on current capacity; and (2) providing more accurate projections than the manual method described previously. The monitors 205, 209, 213 collect data for the following parameters from each server 202, 206, 210:

Processor Utilization (% time that processor is utilized)
Concurrent Client Connections
Memory Utilization (total KB).

In addition to data collection by the monitors, the filter 236 collects data for the following parameters:

Number of Incoming Requests
Average Response Time

It is noted that if the server cluster capacity cannot be determined from the time window selected by the user, an appropriate message is displayed to the user and the user is provided the opportunity to select another time window.

Figure 6:
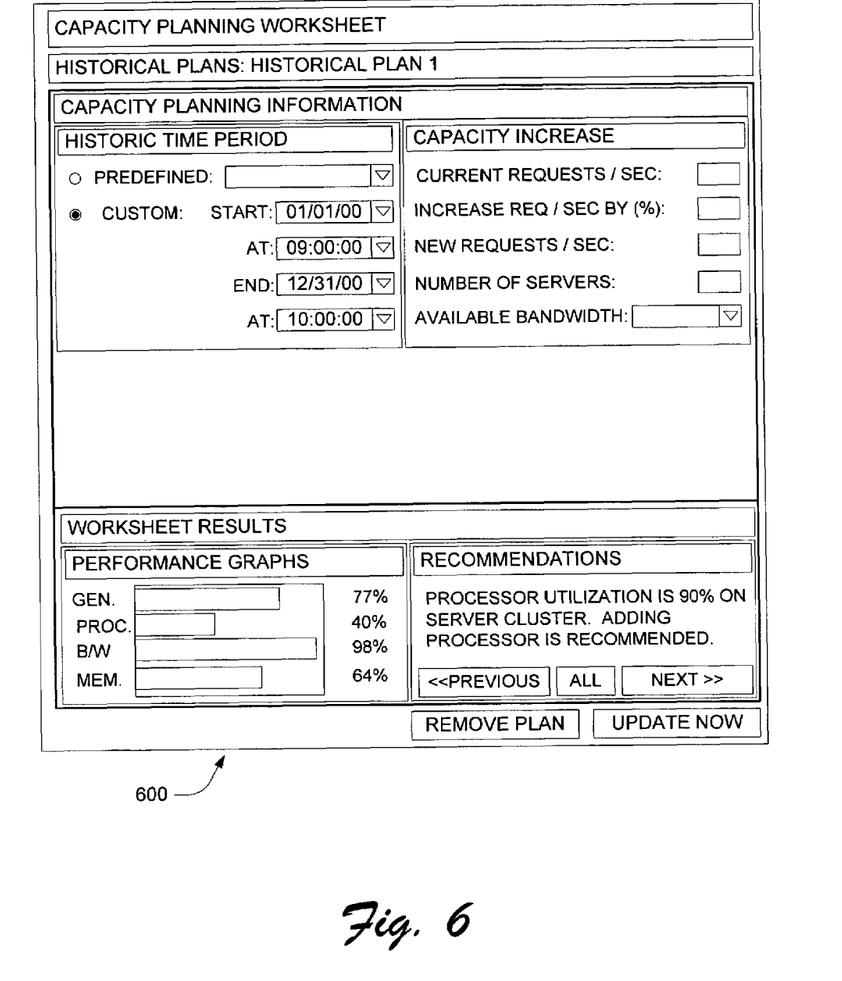
FIG. 6 is a screen shot of a capacity planning worksheet utilized in an historical method of capacity planning.

FIG. 6 shows a user interface 600 for the historical method that is in the form of a capacity planning worksheet, wherein the user enters the time window for which the user wishes to collect server parameter values. The user is also required to manually enter the current load (requests/second) handled by the server cluster 200, the increase in terms of percentage that the user wants the server cluster 200 to handle, the number of servers currently in the server cluster 200, and the available bandwidth. The new load (requests/second) is automatically calculated and displayed using the current load and the specified load increase. Alternatively, the user may enter the new load and, in that case, the percentage increase is automatically calculated.

It is noted that in the historical method—as opposed to the manual method—it is not necessary for the user to estimate the percentages of document types and connection types serviced by the server cluster 200. This is because the filter 236 collects this data. Since real data is utilized instead of estimated data, the historical method is inherently more accurate than the manual method. Also, it is noted that the load table 400 is not utilized.

The server resource utilization calculations require knowledge of the maximum load that the server cluster 200 can handle. If any of the server resources being measured happens to reach a maximum during the measurement time window, then that determination is simple, as it is simply the load value at the time the particular server resource was 100% utilized. However, it is unlikely that will happen. Therefore, the maximum load that the server cluster 200 can handle must first be extrapolated from the collected server parameter values so that the server resource utilization calculations can be made.

The maximum load that the server cluster 200 can handle is calculated from historical data that have been collected in the following manner.

A set of values ($L_i$; $CPU_i$; $TotalBytes_i$) is recorded simultaneously at time i. $L_i$ is the incoming server load at time i, $CPU_i$ is the processor utilization at time i, and $TotalBytes_i$ is the total number of kilobytes transmitted by the server cluster 200 at time i.

Now processor regression constants a and b can be found by transforming processor utilization into linear form. The processor utilization equation is:

$$U_{CPU} = \frac{a}{e^{b \cdot L}}$$

and becomes: $\ln(U_{CPU}) = \ln(a) - b \cdot L$

The natural logarithm function is applied to $CPU_i$ of measured pairs of ($L_i$; $CPU_i$), which gives pairs of ($L_i$; $CPU_i'$), where $CPU_i'$ is $\ln(CPU_i)$.

$L_i$ is substituted for x and $CPU_i'$ is substituted for y in the following formula:

$$y = a + b \cdot x$$

Linear regression is applied to solve this equation:

$$g(x) = \bar{y} + b_{yx} \cdot (x - \bar{x})$$

where:

$$b_{xy} = \frac{\overline{(x - \bar{x}) \cdot (y - \bar{y})}}{\overline{(x - \bar{x})^2}}$$

Therefore, processor regression constants a and b are:

$$a = \bar{y} - b_{yx} \bar{x}$$

$$b = b_{yx}$$

Processor utilization is then derived by solving:

$$U_{CPU} = \frac{e^{a'}}{e^{-b' \cdot L}}$$

where: $a' = \ln(a)$; and $b' = -b$.

Figure 7:
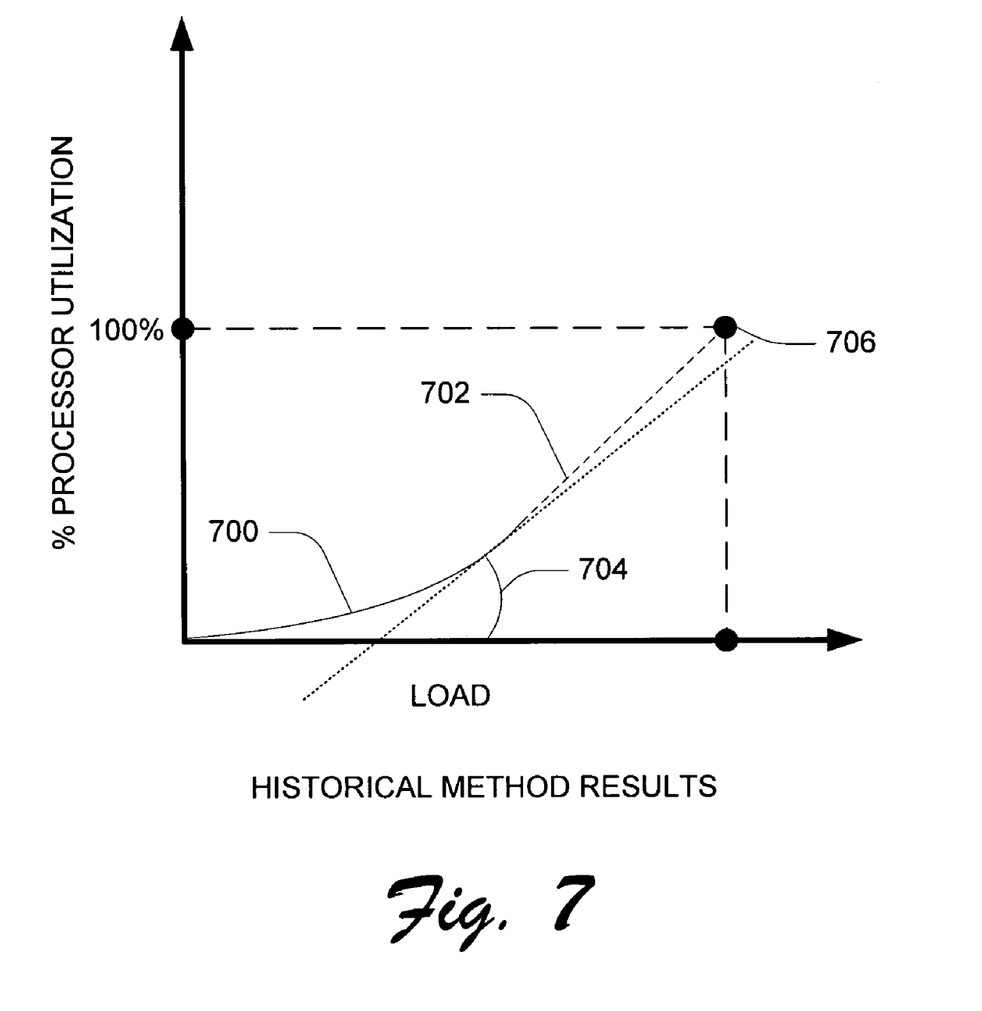
FIG. 7 is a graph of load vs. processor utilization for an historical method of capacity planning.

FIG. 7 shows a load vs. processor utilization graph. The above function is shown in two sections. A first section 700, is graphed using actual data that has been collected from the server cluster 200. A second section 702 is extrapolated from the collected data using a first derivative of $U_{CPU}$ as a function of L:

$$U_{CPU}' = e^{a'} \cdot b' \cdot e^{b' \cdot L}$$

The value of this function at the largest value of L from the collected data will be the function slope, i.e., the tangent between the function curve and the x-axis (load axis). If the derivative value at that point 704 is greater than a predetermined value, for example, $\tan((4\cdot\Pi)/9)$, then it is assumed that the collected data is sufficient to accurately extrapolate the maximum load that can be handled by the system. Thereafter, a value of L is found where $U_{CPU}$ has a value of 100%. This value 706 is the variable X for equations stated below.

General server utilization is derived by solving:

$$U = \frac{L}{X}$$

wherein:
U=general server utilization;
L=specified load; and
X=maximum load that can be handled by the server cluster 200.

Communications bandwidth utilization is derived by solving:

$$U_B = \frac{F_{TCP}}{B} \cdot (c + d \cdot L)$$

wherein:
$U_B$ is communication bandwidth utilization;
$F_{TCP}$ is a transmission overhead factor that, when applied to a certain size page, results in the actual bandwidth necessary to transmit the page;
L is the specified load;
B is the total communication bandwidth available; and
c and d are bandwidth regression constants derived as shown previously.

The memory utilization is derived by first solving the following equation to determine the number of concurrent connections:

$$N = \frac{L}{(X-L)} + S1 \cdot L$$

wherein:
N is the number of concurrent connections;
L is the specified load;
X is the maximum load that can be handled by the server cluster 200; and
S1 is a connection memory factor that is the adjusted average of the incoming connections at different speeds (as explained above).

The memory utilization is thus derived by solving:

$$U_M = \frac{N \cdot (M_{TCP} + M_{IISStruct}) + M_{OS} + M_{IIS}}{M}$$

wherein:
$U_M$ is memory utilization;
N is the number of concurrent connections;
$M_{TCP}$ is an amount of memory for TCP buffers (32 KB per connection);
$M_{IIS}$ is the amount of memory required by a server communication program (50 MB for IIS);
$M_{IISStruct}$ is the amount of memory necessary to support communications program data structures associated with each connection (50 KB per connection for IIS);
$M_{OS}$ is the amount of memory required by a server operating system (64 MB for Windows® NT by Microsoft® Corp.) and
M is the amount of total memory available.

CONCLUSION

The described implementations advantageously provide for capacity planning for a server-client system and, particularly, to a server cluster within a server-client system. The manual method is easier to implement and provides an adequate method for capacity planning that is superior to similar methods and systems known in the art. The historical method, while more difficult to implement, provides an advantage over the manual approach in that it collects server parameter values from the server cluster during operation. Using these actual values provides an even more accurate capacity planning scheme. Other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for deriving server resource utilization estimates for a server cluster that handles multiple document types, the method comprising:
   assigning a document type value to each document type, each document type value indicating a percentage that each document type makes up of a total amount of document types;
   deriving a load table for each document type, each load table containing load table values empirically derived from a server cluster that has a known amount of memory and a processor having a known type and speed, each load table value representing a maximum load that can be handled by the server cluster when the load comprises only one of the multiple document types;
   receiving one or more server cluster parameter values that indicate operating parameters for the server cluster;
   receiving a specified load value that indicates a load desired to be handled by the server cluster;
   utilizing the load tables to derive server resource utilization estimates to determine how handling the specified load will affect the utilization of server resources; and
   recommending a plan to optimize handling of the specified load by increasing resources of the server cluster.

2. The method recited in claim 1, wherein the utilizing the load tables to derive server resource utilization estimates further comprises:
   for each document type, finding the closest match in the corresponding load table between the memory and processor of the server cluster with the memory and processor entries in the load table; and deriving server resource utilization estimates by using the load value of the closest match as the maximum load that can be handled by the server cluster for each document type.

3. The method recited in claim 2, wherein the server resource utilization estimate derived is processor utilization, and the method further comprises:

displaying the server resource utilization estimates;

deriving a first processor regression constant and a second processor regression constant for each document type by:
(1) finding a functional dependency approximation between processor utilization and load for each document type;
(2) transforming the functional dependency into linear form by using logarithmic transformation;
(3) deriving the first and second processor regression constants using linear regression methodology;

finding a partial processor utilization for each document type by dividing the first processor regression constant for a particular document type by e to the power of the product of the specified load, the document type value, and the second processor regression constant for the document type; and summing the partial processor utilizations to derive the processor utilization of the server cluster for the specified load.

4. The method recited in claim 2, wherein the server resource utilization estimate derived is communication bandwidth utilization, and the method further comprises:

deriving a first bandwidth regression constant and a second bandwidth regression constant for each document type by:
(1) finding a functional dependency approximation between communication bandwidth utilization and load for each document type;
(2) transforming the functional dependency into linear form by using logarithmic transformation;
(3) deriving the first and second bandwidth regression constants using linear regression methodology;

determining a transmission overhead factor for each document type that, when applied to a certain size page of the document type, results in the actual bandwidth necessary to transmit the page;

finding a raw partial bandwidth utilization for each document type utilizing the document type value, the specified load, and the first and second bandwidth regression constants for the document type;

finding a weighted partial bandwidth utilization for each document type utilizing the raw partial bandwidth utilization for a document type and the transmission overhead factor for the document type;

finding a partial bandwidth utilization for each document type that is a function of the weighted partial bandwidth utilization for each document type and the total communication bandwidth available; and summing the partial bandwidth utilizations to derive the communication bandwidth utilization.

5. The method recited in claim 2, wherein the server resource utilization estimate derived is communication bandwidth utilization, and the method further comprises:

deriving a first bandwidth regression constant and a second bandwidth regression constant for each document type by:
(1) finding a functional dependency approximation between communication bandwidth utilization and load for each document type;
(2) transforming the functional dependency into linear form by using logarithmic transformation;
(3) deriving the first and second bandwidth regression constants using linear regression methodology;

determining a transmission overhead factor for each document type that, when applied to a certain size page of the document type, results in the actual bandwidth necessary to transmit the page;

finding a raw partial bandwidth utilization for each document type by multiplying the document type value by a product of the specified load and the second bandwidth regression constant for the document type, and adding the first bandwidth regression constant for the document type;

finding a weighted partial bandwidth utilization for each document type by multiplying the raw partial bandwidth utilization for a document type by the transmission overhead factor for the document type;

finding a partial bandwidth utilization for each document type by dividing the weighted partial bandwidth utilization for each document type by the total communication bandwidth available; and summing the partial bandwidth utilizations to derive the communication bandwidth utilization.

6. The method recited in claim 2, wherein the server resource utilization estimate derived is memory utilization, the method further comprising:

for each document type, deriving a connection memory factor as a function of the incoming connections at different speeds;

for each document type, deriving a weighted connection memory factor as a function of the connection memory factor, the specified load and the document type value;

for each document type, deriving a page load ratio utilizing the document type value, the specified load, the load value obtained from load table for the document type and the document type value;

for each document type, deriving a number of concurrent connections from the weighted connection memory factor and the page load ratio;

summing the number of concurrent connections for each document type to derive a total number of concurrent connections; and deriving the memory utilization by multiplying from the total number of concurrent connections, the amount of memory necessary to support each connection for communications, the amount of memory necessary to support data structures associated with each connection, the amount of memory required by a server operating system, the amount of memory required by the server communication program, and the total memory available.

7. The method recited in claim 2, wherein the server resource utilization estimate derived is memory utilization, the method further comprising:

for each document type, deriving a connection memory factor that is the adjusted average of the incoming connections at different speeds;

for each document type, deriving a weighted connection memory factor by multiplying the connection memory factor by a product of the specified load and the document type value;

for each document type, deriving a page load ratio by dividing the product of the document type value and the specified load by the difference between the load value obtained from load table for the document type and the product of the document type value and the specified load;

for each document type, adding the weighted connection memory factor and the page load ratio to derive a number of concurrent connections for each document type;

summing the number of concurrent connections for each document type to derive a total number of concurrent connections; and deriving the memory utilization by multiplying the total number of concurrent connections by the sum of the amount of memory necessary to support each connection for communications and the amount of memory necessary to support data structures associated with each connection, and adding the amount of memory required by a server operating system and the amount of memory required by the server communication program, and dividing the result thereof by total memory available.

8. The method recited in claim 2, wherein the server resource utilization estimate derived is general server utilization, and wherein the method further comprises:

deriving a partial load for each document type from the document type value for a document type and the specified load;

deriving a partial utilization value for each document type from the partial load for a document type and the load table value for the document type; and deriving the general server utilization by summing the partial utilization values.

9. The method recited in claim 2, wherein the server resource utilization estimate derived is general server utilization, and wherein the method further comprises:

deriving a partial load for each document type by multiplying the document type value for a document type by the specified load;

deriving a partial utilization value for each document type by dividing the partial load for a document type by the load table value for the document type; and deriving the general server utilization by summing the partial utilization values.

10. One or more computer-readable media having computer-readable instructions thereon which, when executed by one or more computers, cause the computers to implement the method of claim 2.

11. A computer-implemented method to derive server utilization estimates for a server cluster that handles a plurality of document types comprising:

collecting document type information that describes a percentage of a total number of documents handled by the server cluster for each of the plurality of document types;

based upon the collected document type information, determining one or more server resource utilization values for the server cluster; and outputting the one or more server resource utilization values.

12. The computer-implemented method of claim 11, wherein the collecting includes:

outputting a user interface having one or more portions to receive input of document type information from a user; and receiving the percentage of the total number of documents handled by the server cluster for each of the plurality of document types input by the user via the one or more portions of the user interface.

13. The computer-implemented method of claim 11, wherein the collecting document type information comprises:

collecting historical usage data during operation of the server cluster; and based upon the historical usage data, determining the percentage of the total number of documents handled by the server cluster for each of the plurality of document types.

14. The computer-implemented method of claim 11, wherein each of the plurality of document types specifies a kind of document and a document size range.

15. The computer-implemented method of claim 11, wherein the plurality of document types includes at least hypertext markup language (HTML) documents and active server pages (ASP).

16. The computer-implemented method of claim 11, further comprising:

maintaining a load table, the load table including empirically derived load values corresponding to each of the plurality of document types for each of a plurality of server configurations;

receiving a plurality of server parameters indicative of a configuration of one or more servers in the server cluster; and based upon the plurality of server parameters and the document type information, referencing the load table to determine the one or more server resource utilization values.

17. The computer-implemented method of claim 16, wherein one said load value corresponding to one said document type for a particular server configuration indicates a maximum load for the particular server configuration used with the one said document type.

18. The computer-implemented method of claim 16, wherein the plurality of server parameters are selected from a group consisting of: a specified load to be handled by the server cluster, a number of servers in the server cluster, an available communications bandwidth, a processor type for the server cluster, a number of processors per server, a processor speed, and an amount of memory per server.

19. The computer-implemented method of claim 11, wherein the one or more server resource utilization values are selected from a group consisting of: processor utilization, memory utilization, communication bandwidth utilization, and general server utilization.

20. The computer-implemented method of claim 11, wherein the determining one or more server resource utilization values for the server cluster comprises determining a value for each of processor utilization, memory utilization, communication bandwidth utilization, and general server utilization.

21. The computer-implemented method of claim 11 further comprising outputting a recommendation regarding whether to make a change to the server cluster to optimize performance based upon the one or more server resource utilization value.

22. The computer-implemented method of claim 11 further comprising:
collecting client connection information describing a percentage of a total number of client connections for each of a plurality of connection types; and
utilizing the client connection information with the document type information to determine the one or more server resource utilization values.

23. One or more computer-readable storage media comprising computer executable instructions to derive server utilization estimates for a server cluster that handles a plurality of document types which, when executed, cause a computer to perform acts comprising:
collecting document type information that describes a percentage of a total number of documents handled by the server cluster for each of the plurality of document types;
based upon the collected document type information, determining one or more server resource utilization values for the server cluster; and
outputting the one or more server resource utilization values.

24. One or more computer-readable storage media as recited in claim 23, wherein the collecting includes:
outputting a user interface having one or more portions to receive input of document type information from a user; and
receiving the percentage of the total number of documents handled by the server cluster for each of the plurality of document types input by the user via the one or more portions of the user interface.

25. One or more computer-readable storage media as recited in claim 23, wherein the collecting document type information comprises:
collecting historical usage data during operation of the server cluster; and
based upon the historical usage data, determining the percentage of the total number of documents handled by the server cluster for each of the plurality of document types.

26. One or more computer-readable storage media as recited in claim 23, wherein each of the plurality of document types specifies a kind of document and a document size range.

27. One or more computer-readable storage media as recited in claim 23, wherein the plurality of document types includes at least hypertext markup language (HTML) documents and active server pages (ASP).

28. One or more computer-readable storage media as recited in claim 23, further comprising:
maintaining a load table, the load table including empirically derived load values corresponding to each of the plurality of document types for each of a plurality of server configurations;
receiving a plurality of server parameters indicative of a configuration of one or more servers in the server cluster; and
based upon the plurality of server parameters and the document type information, referencing the load table to determine the one or more server resource utilization values.

29. One or more computer-readable storage media as recited in claim 28, wherein one said load value corresponding to one said document type for a particular server configuration indicates a maximum load for the particular server configuration used with the one said document type.

30. One or more computer-readable storage media as recited in claim 28, wherein the plurality of server parameters are selected from a group consisting of: a specified load to be handled by the server cluster, a number of servers in the server cluster, an available communications bandwidth, a processor type for the server cluster, a number of processors per server, a processor speed, and an amount of memory per server.

31. One or more computer-readable storage media as recited in claim 23, wherein the one or more server resource utilization values are selected from a group consisting of: processor utilization, memory utilization, communication bandwidth utilization, and general server utilization.

32. One or more computer-readable storage media as recited in claim 23, wherein the determining one or more server resource utilization values for the server comprises determining a value for each of processor utilization, memory utilization, communication bandwidth utilization, and general server utilization.

33. One or more computer-readable storage media as recited in claim 23 further comprising outputting a recommendation regarding whether to make a change to the server cluster to optimize performance based upon the one or more server resource utilization values.

34. One or more computer-readable storage media as recited in claim 23 further comprising:
collecting client connection information describing a percentage of a total number of client connections for each of a plurality of connection types; and
utilizing the client connection information along with the document type information to determine the one or more server resource utilization values.

35. A computer-implemented method of estimating server utilization for a server cluster comprising:
maintaining a load table, the load table including empirically derived load values corresponding to each of a plurality of document types handled by the server cluster for each of a plurality of server configurations specified for servers included in the server cluster;
outputting a user interface configured with one or more portions to receive data input by a user to estimate server utilization;
collecting via the user interface:
server parameters input by the user specifying a load to be handled by the server cluster and a configuration of the servers included in the server cluster; and
document type information input by the user describing a percentage usage for each type of document relative to a total amount of documents handled by the server cluster;
based upon the plurality of server parameters and the document type information, referencing the load table to determine a server resource utilization value; and
displaying via the user interface the determined server resource utilization value.

36. The computer-implemented method as recited in claim 35, wherein the user interface is configured to concurrently display the one or more portions to receive data and a results portion to display the determined server resource value.

37. The computer-implemented method as recited in claim 35, wherein the server resource utilization value is selected from a group consisting of: processor utilization, memory utilization, communication bandwidth utilization, and general server utilization.

38. The computer-implemented method as recited in claim 35 further comprising displaying via the user interface a recommendation regarding whether to make a change to the server cluster to optimize performance based upon the determined server resource utilization value.

39. The computer-implemented method as recited in claim 35, wherein the server parameters input by the user are selected from a group consisting of: a specified load to be handled by the server cluster, a number of servers in the server cluster, an available communications bandwidth, a processor type for the server cluster, a number of processors per server, a processor speed, and an amount of memory per server.

40. One or more computer-readable media having computer-readable instructions thereon which, when executed by one or more computers, cause the computers to implement the method of claim 35.

* * * * *